United States Patent
Tang

(10) Patent No.: US 11,546,889 B2
(45) Date of Patent: *Jan. 3, 2023

(54) SIGNAL TRANSMISSION METHOD AND APPARATUS

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/108,419

(22) Filed: Dec. 1, 2020

(65) Prior Publication Data

US 2021/0084638 A1 Mar. 18, 2021

Related U.S. Application Data

(63) Continuation of application No. 16/310,242, filed as application No. PCT/CN2016/099608 on Sep. 21, 2016, now Pat. No. 10,887,870.

(51) Int. Cl.
*H04W 4/00* (2018.01)
*H04W 72/04* (2009.01)
(Continued)

(52) U.S. Cl.
CPC ....... *H04W 72/0406* (2013.01); *H04L 5/0007* (2013.01); *H04L 5/0053* (2013.01);
(Continued)

(58) Field of Classification Search
CPC ... H04W 28/04; H04W 72/04; H04W 72/042; H04W 88/08; H04W 72/0406;
(Continued)

(56) References Cited

U.S. PATENT DOCUMENTS 10,314,040 B2 * 6/2019 Kimura ............. H04L 27/26025
10,880,061 B2 * 12/2020 Tang ..................... H04W 72/04
(Continued)

FOREIGN PATENT DOCUMENTS

CN 105934895 9/2016
TW 201618583 5/2016
(Continued)

OTHER PUBLICATIONS

JPO, Office Action for JP Application No. 2019-513808, dated Nov. 27, 2020.
(Continued)

*Primary Examiner* — Phuongchau Ba Nguyen
(74) *Attorney, Agent, or Firm* — Hodgson Russ LLP

(57) ABSTRACT

Provided in embodiments of the present invention are a signal transmission method and an apparatus, the method comprising: a terminal device determining a resource pool transmitting a first signal according to a first numerology used to transmit the first signal; the terminal device using a transmission resource in the resource pool transmitting the first signal to transmit the first signal.

17 Claims, 1 Drawing Sheet

(51) Int. Cl.
*H04W 72/02* (2009.01)
*H04L 5/00* (2006.01)

(52) U.S. Cl.
CPC .......... *H04L 5/0091* (2013.01); *H04W 72/02* (2013.01); *H04W 72/0486* (2013.01)

(58) Field of Classification Search
CPC ............. H04W 72/02; H04W 72/0486; H04W 72/044; H04W 76/10; H04L 5/0007; H04L 5/0053; H04L 5/0091
See application file for complete search history.

(56) References Cited

U.S. PATENT DOCUMENTS

| | | | |
|---|---|---|---|
| 10,887,870 B2* | 1/2021 | Tang | H04L 5/0007 |
| 10,945,236 B2* | 3/2021 | Seo | H04W 76/14 |
| 11,201,717 B2* | 12/2021 | Tang | H04L 27/26025 |
| 2011/0141980 A1* | 6/2011 | Wang | H04W 72/042 370/329 |
| 2016/0352551 A1* | 12/2016 | Zhang | H04L 27/26025 |
| 2017/0164350 A1* | 6/2017 | Sun | H04W 76/27 |
| 2018/0048511 A1* | 2/2018 | Hakola | H04L 5/0064 |
| 2018/0176892 A1* | 6/2018 | Kim | H04W 52/386 |
| 2019/0182872 A1* | 6/2019 | Chen | H04W 48/16 |
| 2019/0288809 A1* | 9/2019 | Iyer | H04B 7/0617 |
| 2020/0322924 A1* | 10/2020 | Kim | H04W 72/02 |
| 2020/0403737 A1* | 12/2020 | Yeo | H04W 52/146 |
| 2021/0014830 A1* | 1/2021 | Liu | H04L 5/0007 |
| 2021/0345263 A1* | 11/2021 | Tooher | H04L 5/0092 |
| 2022/0271893 A1* | 8/2022 | Liu | H04L 1/18 |

FOREIGN PATENT DOCUMENTS

| | | |
|---|---|---|
| WO | 2010081293 | 7/2010 |
| WO | 2016004901 | 1/2016 |

OTHER PUBLICATIONS

EPO, Communication for EP Application No. 16916458.9, dated Mar. 2, 2021.
TIPO, Office Action for TW Application No. 106128832, dated Feb. 26, 2021.
CNIPA, First Office Action for CN Application No. 202010954561.0, dated May 25, 2022.
CNIPA, Second Office Action for ON Application No. 202010954561.0, dated Aug. 24, 2022.
Huawei et al., "Resource pool design and multiplexing of SA and its associated data," 3GPP TSG RAN WG1 Meeting #85, R1-164056, May 2016.

* cited by examiner

SIGNAL TRANSMISSION METHOD AND APPARATUS

CROSS REFERENCE

The present application is a continuation of U.S. patent application Ser. No. 16/310,242 filed on Dec. 14, 2018, which is a U.S. National Stage Entry of International Application No. PCT/CN2016/099608, filed on Sep. 21, 2016. The entire disclosures of the aforementioned applications are incorporated herein by reference.

TECHNICAL FIELD

The present disclosure relates to the field of communication, and in particular, to a signal transmission method and apparatus in the field of communication.

BACKGROUND

In a future communication system, a contention-based uplink access mode will be introduced, and a specific resource pool is allocated for the terminal device, and the terminal device competes for resources in the resource pool in a competitive manner without network device scheduling to perform random access, or may also compete for resources in the resource pool in a competitive manner to transmit data.

It should be noted that the information disclosed in the background section above is only for enhancing the understanding of the background of the present disclosure, and thus may include information that does not constitute prior art known to those of ordinary skill in the art.

SUMMARY

The present disclosure provides a signal transmission method and apparatus.

In a first aspect, a signal transmission method is provided, including: a terminal device determining a resource pool transmitting a first signal according to a first numerology used to transmit the first signal; the terminal device using a transmission resource in the resource pool transmitting the first signal to transmit the first signal.

In a first possible implementation manner of the first aspect, the first numerology and/or each of the at least one numerology includes at least one of the following: a subcarrier spacing, an amount of subcarriers included in a system bandwidth, an amount of subcarriers included in a Physical Resource Block PRB, a symbol length of Orthogonal Frequency Division Multiplexing OFDM, an amount of points of Fast Fourier Transformation FFT or Inverse Fourier Transformation IFFT used to generate OFDM signals, an amount of Orthogonal Frequency Division Multiplexing OFDM symbols included in a Transmission Time Interval TTI, an amount of TTIs included in a first time period, and a Cyclic Prefix CP type of the first signal, and a time length of the signal CP. The subcarrier spacing refers to a frequency interval of adjacent subcarriers, for example, 15 kHz, 60 kHz, etc.; the number of subcarriers under a specific system bandwidth is, for example, the number of subcarriers corresponding to each possible system bandwidth; the number of subcarriers included in the PRB, for example, may be typically an integer multiple of 6 or 16; the number of OFDM symbols included in the TTI may be, for example, typically an integer multiple of 2, 4, 7, or may also be an integer multiple of 14; the number of TTIs included in the first time period may refer to the number of TTIs included in the time length of 1 ms or 10 ms; the first signal CP type may be that a cyclic prefix uses a regular CP or an extended CP; the time length of CP of the first signal.

Optionally, the numerology may further include: a basic parameter in a newly defined resource partitioning manner in a future network system, which may be, for example, a basic frequency domain unit, a basic frequency domain unit pattern, a subcarrier pattern, an occupied position of a reference symbol in a time domain unit, a TTI pattern in the unit period, a pattern of the subframe in the frame, a pattern of the slot in the subframe, an OFDM pattern in the slot, and the like.

In combination with the foregoing possible implementation manner of the first aspect, in a second possible implementation manner of the first aspect, before a terminal device determining a resource pool transmitting a first signal according to a first numerology used to transmit the first signal, the method further includes:

the terminal device acquiring a corresponding relationship between at least one resource pool and at least one numerology, wherein the corresponding relationship is used to indicate that each numerology in the at least one numerology corresponds to one or more resource pools, the at least one numerology includes the first numerology; wherein a terminal device determining a resource pool transmitting a first signal according to a first numerology used to transmit the first signal includes: the terminal device determining the resource pool transmitting the first signal in the at least one resource pool according to the first numerology used to transmit the first signal and the corresponding relationship.

Optionally, the corresponding relationship between the at least one resource pool and the at least one numerology may be that: one resource pool in the at least one resource pool corresponds to one numerology, or one numerology may correspond to one or more resource pools, that is, different resource pools may correspond to the same numerology.

In combination with the foregoing possible implementation manners of the first aspect, in a third possible implementation manner of the first aspect, the terminal device acquiring a corresponding relationship between at least one resource pool and at least one numerology includes: the terminal device receiving first indication information sent by a network device, wherein the first indication information is used to indicate the corresponding relationship; the terminal device acquiring the corresponding relationship between the at least one resource pool and the at least one numerology according to the first indication information.

Optionally, the terminal device may receive the first indication information sent by the network device through the user-specific signaling, and the terminal device may also receive the first indication information sent by the network device through the broadcast signaling, where the terminal device may receive the first indication information sent by the network device through Downlink Control Information (DCI). Of course, the terminal device may also receive the first indication information sent by the network device through other manners.

In combination with the foregoing possible implementation manners of the first aspect, in a fourth implementation manner of the first aspect, the terminal device determining the resource pool transmitting the first signal in the at least one resource pool according to the first numerology used to transmit the first signal and the corresponding relationship includes: in the case where the corresponding relationship indicates that a plurality of resource pools correspond to the first numerology, the terminal device determining a resource pool transmitting the first signal in a plurality of resource pools.

In combination with the foregoing possible implementation manners of the first aspect, in a fifth implementation manner of the first aspect, the terminal device determining a resource pool in the plurality of resource pools includes:

randomly selecting one resource pool among the plurality of resource pools as a resource pool transmitting the first signal; or the terminal device determining a resource pool index based on a transmission parameter of the terminal device, and determining a resource pool transmitting the first signal in the plurality of resource pools according to the resource pool index; or the terminal device selecting based on the load of the plurality of resource pools, optionally, after performing load measurement to the plurality of resource pools, the terminal device selecting a resource pool with a minimum load or with a load lower than a first threshold as a resource pool transmitting the first signal.

Specifically, if the terminal device determines a resource pool in the at least one resource pool, the first signal is transmitted by using the resource in the resource pool, and if the terminal device determines a plurality of resource pools in the at least one resource pool, the resource pool can be determined in the plurality of resource pools in three ways. In the first way, one resource pool is arbitrarily selected in the plurality of resource pools as the resource pool. In the second way, the terminal device calculates the resource pool index according to the transmission parameters. For example, the Radio Network Temporary Identity (RNTI) or the access cell identifier of the terminal device is used to calculate the index of the resource pool, and the resource pool is determined in the plurality of resource pools according to the resource pool index. In the third way, the terminal device can perform load measurement on the plurality of resource pools, and select the resource pool with the minimum load among the plurality of resource pools as the resource pool. For example, the power of signals received in the plurality of resource pools can be measured, and the resource pool with the smallest signal average receiving power is selected as the resource pool. If there is a plurality of resource pools with the smallest signal average receiving power, one resource pool among the resource pools with the smallest average power may be arbitrarily selected as the resource pool.

In combination with the foregoing possible implementation manners of the first aspect, in a sixth implementation manner of the first aspect, before the terminal device determining a resource pool transmitting the first signal in a plurality of resource pools, the method further includes: the terminal device receiving second indication information sent by the network device, wherein the second indication information is used to indicate a resource pool index used by the terminal device to transmit the first signal; wherein the terminal device determining a resource pool in the plurality of resource pools includes: the terminal device determining a resource pool transmitting the first signal in the plurality of resource pools according to a resource pool index indicated by the second indication information.

In combination with the foregoing possible implementation manners of the first aspect, in a seventh implementation manner of the first aspect, before a terminal device determining a resource pool transmitting a first signal according to a first numerology used to transmit the first signal, the method further includes: the terminal device determining the first numerology used to transmit the first signal.

In combination with the foregoing possible implementation manners of the first aspect, in an eighth implementation manner of the first aspect, the terminal device determining the first numerology used to transmit the first signal includes at least one of the following: the terminal device determining the first numerology used to transmit the first signal according to a service type of the first signal; the terminal device determining the first numerology used to transmit the first signal according to a frequency band of the first signal; the terminal device determining the first numerology used to transmit the first signal according to a path loss parameter between the terminal device and the network device.

In combination with the foregoing possible implementation manners of the first aspect, in a ninth implementation manner of the first aspect, the terminal device determining the first numerology used to transmit the first signal includes: the terminal device receiving third indication information sent by a network device, wherein the third indication information is used to indicate that the first numerology is used to transmit the first signal; the terminal device determining the first numerology used to transmit the first signal according to the third indication information.

Specifically, the network device may send the third indication information to the terminal device to indicate the first numerology used by the terminal device to transmit the first signal. Optionally, the terminal device may receive the third indication information sent by the network device through the user-specific signaling. The terminal device may also receive the third indication information sent by the network device through the broadcast signaling. The terminal device may receive the third indication information sent by the network device through the Downlink Control Information (DCI). Of course, the terminal device can also receive the third indication information sent by the network device through other manners.

In combination with the foregoing possible implementation manners of the first aspect, in a tenth implementation manner of the first aspect, the terminal device determining the first numerology used to transmit the first signal includes: the terminal device detecting a numerology of a second signal other than the first signal, and determining the numerology of the second signal to transmit the first signal. That is, the terminal device can detect the numerology used for signals other than the signals that need to be transmitted by itself, and the numerology of other signals can be used as its first numerology.

In combination with the foregoing possible implementation manners of the first aspect, in an eleventh implementation manner of the first aspect, the terminal device using a transmission resource in the resource pool transmitting the first signal to transmit the first signal includes:

the terminal device randomly selecting a transmission resource from at least one transmission resource included in a resource pool transmitting the first signal, to transmit the first signal; or the terminal device determining a transmission resource index based on a transmission parameter of the terminal device, determining a transmission resource transmitting the first signal in at least one transmission resource included in a resource pool transmitting the first signal according to the transmission resource index, and transmitting the first signal on the transmission resource transmitting the first signal; or the terminal device determining a transmission resource transmitting the first signal in at least one transmission resource included in a resource pool transmitting the first signal according to a pre-configured transmission resource index, and transmitting the first signal on the transmission resource transmitting the first signal; or the terminal device performing load measurement on at least one transmission resource included in a resource pool transmitting the first signal, and selecting a transmission resource with a minimum load or with a load lower than a second threshold, and transmitting the first signal on the transmission resource with the minimum load or with the load lower than the second threshold.

Specifically, the resource pool transmitting the first signal includes at least one transmission resource, and it may be performed in four manners to determine how to transmit the transmission resource of the first signal in the resource pool transmitting the first signal. In the first manner, one transmission resource is randomly selected among at least one transmission resource included in the resource pool to transmit the first signal. In the second manner, a transmission resource index is calculated according to a transmission parameter of the terminal device. For example, the transmission parameter can calculate a transmission resource index for a wireless network temporary identifier of the terminal device or a cell identifier of the terminal device, determine, according to the transmission resource index, the transmission resource transmitting the first signal in the at least one transmission resource included in the resource pool. In the third manner, the terminal device retains a pre-configured transmission resource index, and the terminal device determines, according to the pre-configured transmission resource index, the resource transmitting the first signal in the at least one transmission resource. In the fourth manner, the terminal device may measure the at least one transmission resource included in the resource pool, select the transmission resource with the minimum load as the resource transmitting the signal. For example, the terminal device measures the signal receiving power of each of the at least one transmission resource in the resource pool, and uses the transmission resource with the lowest average receiving power as the resource transmitting the first signal, and if there are multiple transmission resources with the lowest signal average receiving power, the first signal may be transmitted by any one transmission resource arbitrarily selected from the plurality of transmission resources.

In combination with the foregoing possible implementation manners of the first aspect, in a twelfth implementation manner of the first aspect, the resource pool includes at least one transmission resource, the resource pool may be a resource pool transmitting the first signal, and/or at least one resource pool included in the corresponding relationship, each of the at least one transmission resource includes: a physical time-frequency resource and/or a sequence resource. The sequence resource may be a sequence in a sequence group, or may also be code words in a codebook, or may also be an interleaving pattern. Further, the transmission resources in each of at least one resource pool are orthogonal to each other, and each resource pool in at least one resource pool is orthogonal to each other, which may be orthogonal to each other in physical time-frequency resources, or may be orthogonal to each other in the sequence resources, or may be orthogonal to each other both in physical time-frequency resources and in the sequence resources.

In combination with the foregoing possible implementation manners of the first aspect, in the thirteenth implementation manner of the first aspect, the first signal is a random access signal, a data signal or an uplink control signal.

A second aspect provides a signal transmission method, including: a network device sending first indication information to a terminal device, wherein the first indication information is used to indicate a corresponding relationship, and the corresponding relationship is used to indicate each numerology in the at least one numerology corresponds to one or more resource pools.

In a first possible implementation manner of the second aspect, the network device sends the second indication information to the terminal device, wherein the second indication information is used to indicate the resource pool index used by the terminal device to transmit the first signal, so that the terminal device determines, in the plurality of resource pools, a resource pool transmitting the first signal according to the resource pool index indicated by the second indication information.

In combination with the foregoing possible implementation manners of the second aspect, in a second implementation manner of the second aspect, the network device sends third indication information to the terminal device, wherein the third indication information is used to indicate that the first numerology is adopted to transmit the first signal, so that the terminal device determines, according to the third indication information, the first numerology used to transmit the first signal.

In a third aspect, there is provided a signal transmission apparatus, for performing the method of any of the above first aspect or any of the possible implementations of the first aspect. In particular, the apparatus includes units for performing the method of the above first aspect or any of the possible implementations of the first aspect.

In a fourth aspect, there is provided a signal transmission apparatus, for performing the method of any of the above second aspect or any of the possible implementations of the second aspect. In particular, the apparatus includes units for performing the method of the above second aspect or any of the possible implementations of the second aspect.

In a fifth aspect, a signal transmission apparatus is provided, including: a receiver, a transmitter, a memory, a processor, and a bus system. The receiver, the transmitter, the memory and the processor are connected by the bus system. The memory is configured to store instructions. The processor is configured to execute instructions stored in the memory, to control the receiver to receive signals and control the transmitter to transmit signals. When the processor executes instructions stored in the memory, the execution causes the processor to perform the method of the first aspect or any of possible implementations of the first aspect.

In a sixth aspect, a signal transmission apparatus is provided, including: a receiver, a transmitter, a memory, a processor, and a bus system. The receiver, the transmitter, the memory and the processor are connected by the bus system. The memory is configured to store instructions. The processor is configured to execute instructions stored in the memory, to control the receiver to receive signals and control the transmitter to transmit signals. When the processor executes instructions stored in the memory, the execution causes the processor to perform the method of the second aspect or any of possible implementations of the second aspect.

In a seventh aspect, there is provided a computer readable medium for storing a computer program, the computer program including instructions for performing the method of the first aspect or any of possible implementations of the first aspect.

In an eighth aspect, there is provided a computer readable medium for storing a computer program, the computer program including instructions for performing the method of the second aspect or any of possible implementations of the second aspect.

Other features and advantages of the present disclosure will be apparent from the following detailed description, or be acquired in part by the practice of the present disclosure.

It should be understood that the above general description and the following detailed description are merely exemplary and explanatory, and are not limiting of the present disclosure.

BRIEF DESCRIPTION OF THE DRAWINGS

In order to more clearly illustrate technical solutions of embodiments of the present disclosure, the drawings to be used in the embodiments or the prior art will be briefly described below. It is obvious that the drawings in the following description are only some embodiments of the present disclosure. Those skilled in the art can also obtain other drawings based on these drawings without paying any creative work.

DETAILED DESCRIPTION

The technical solutions in the embodiments of the present disclosure will be clearly and completely described in the following with reference to the accompanying drawings in the embodiments of the present disclosure. It is obvious that the described embodiments are a part of the embodiments of the present disclosure, but not all of the embodiments. All other embodiments obtained by those skilled in the art based on the embodiments of the present disclosure without creative efforts are within the scope of the present disclosure.

It should be understood that the technical solutions of the embodiments of the present disclosure can be applied to various communication systems, for example, the Global System of Mobile communication ("GSM") system, Code Division Multiple Access ("CDMA") system, Wideband Code Division Multiple Access ("WCDMA") system, General Packet Radio Service ("GPRS"), Long Term Evolution ("LTE") system, LTE Frequency Division Duplex ("FDD") system, LTE Time Division Duplex ("TDD"), Universal Mobile Telecommunication System ("UMTS") or Worldwide Interoperability for Microwave Access ("WiMAX") communication system, and communication systems that may appear in the future.

It should be further understood that, in the embodiment of the present disclosure, the terminal device may be referred to as User Equipment ("UE"), a terminal device, a Mobile Station ("MS"), a Mobile Terminal or terminal devices in a future 5G network, or the like. The terminal device can communicate with one or more core networks via a Radio Access Network ("RAN"). For example, the terminal may be a mobile phone (or called as a "cellular" telephone) or a computer with a mobile terminal, or the like. For example, the terminal can also be a portable, pocket, handheld, computer built-in or in-vehicle mobile device that exchanges voice and/or data with the wireless access network.

The network device can be used to communicate with the mobile device, and the network device may be a Base Transceiver Station ("BTS") in the Global System of Mobile communication ("GSM") or Code Division Multiple Access ("CDMA"), or it may also be a NodeB("NB") in Wideband Code Division Multiple Access ("WCDMA"), or it may also be an Evolutional Node B("eNB" or "eNodeB") in LTE, or a relay station or access point, or an in-vehicle device, a wearable device, and access network devices in the future 5G network.

Figure 1:
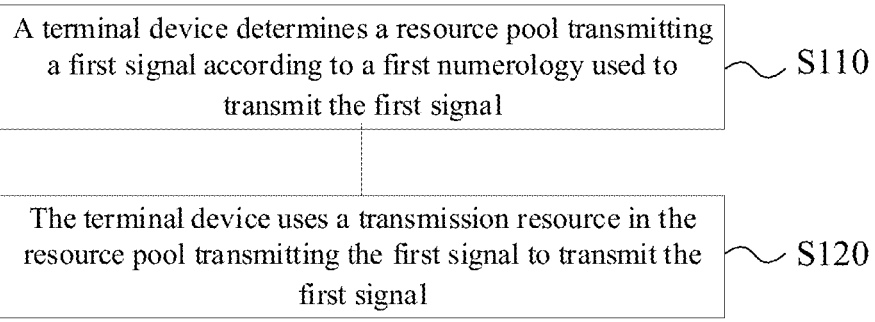
FIG. 1 is a schematic diagram of a signal transmission method according to an embodiment of the present disclosure.

FIG. 1 shows a schematic flow chart of a signal transmission method 100 according to an embodiment of the present disclosure. FIG. 1 shows steps or operations of the signal transmission method, but these steps or operations are merely examples. The embodiments of the present disclosure may also perform other operations or variations of the operations of FIG. 1. The method 100 includes:

S110, a terminal device determining a resource pool transmitting a first signal according to a first numerology (numerology) used to transmit the first signal;

S120, the terminal device using a transmission resource in the resource pool transmitting the first signal to transmit the first signal.

Optionally, in S110, the terminal device may determine, according to the corresponding relationship between the numerology and the resource pool, a resource pool transmitting the first signal. Of course, the terminal device may also determine the resource pool transmitting the first signal according to a preset internal relationship or logical relationship between the numerology and the resource pool. Of course, the terminal device may also determine the resource pool transmitting the first signal according to the first numerology through other manners.

Therefore, the terminal device can obtain the corresponding resource pool according to the first numerology, and then the terminal device uses the transmission resource in the resource pool to transmit the first signal. In this way, the terminal device can determine the corresponding resource pool according to the numerology, which avoids allocating a specific resource pool for the terminal device in the prior art. The terminal device may determine the resource pool corresponding to the first signal according to the first signal, which may also improve the flexibility of the terminal device to select the resource pool.

Further, different resource pools may be selected for different service requirements. For example, when the first signal is a first service type, the first resource pool is selected, and when the first signal is a second service type, the second resource pool is selected. In this way, requirements of different services may be met.

Optionally, the first signal may be a random access signal, which may be, for example, a Preamble signal or a Physical Random Access Channel ("PRACH"), or may be a data signal or an uplink control signal, for example, Physical Uplink Control Channel ("PUCCH") or Schedule Request, or the like, and the present disclosure is not limited thereto.

As an optional embodiment, before S110, the method 100 further includes: the terminal device acquiring a corresponding relationship between at least one resource pool and at least one numerology, wherein the corresponding relationship is used to indicate that each numerology in the at least one numerology corresponds to one or more resource pools, the at least one numerology includes the first numerology; wherein S110 includes: the terminal device determining the resource pool transmitting the first signal in the at least one resource pool according to the first numerology used to transmit the first signal and the corresponding relationship.

As an optional embodiment, the terminal device can obtain the corresponding relationship between the at least one resource pool and the at least one numerology through two manners. In the first manner, the network device sends first indication information to the device on the terminal, wherein the first indication information is used to indicate the corresponding relationship. The terminal device receives the first indication information, and acquires a corresponding relationship between the at least one resource pool and the at least one numerology according to the first indication information. Specifically, the network device may send the first indication information through user-specific signaling or send the first indication information through DCI. The terminal device receives the first indication information through the user-specific signaling, or receives the first indication information through the DCI. Of course, the network device may also send the first indication information to the terminal device in manners specified by other protocols, and the terminal device receives the first indication information sent by the network device in a manner specified by the protocol, and the embodiment of the present disclosure is not limited thereto. In the second manner, the terminal device may acquire a corresponding relationship between the at least one numerology and the at least one resource pool reserved locally. It should be understood that, the terminal device may acquire the corresponding relationship only once, and uses the corresponding relationship to determine the resource pool when determining the resource pool according to the numerology adopted by the terminal device itself subsequently.

Optionally, the corresponding relationship between the at least one resource pool and the at least one numerology may be that: one resource pool in the at least one resource pool corresponds to one numerology, or one numerology may correspond to one or more resource pools, that is, different resource pools may correspond to the same numerology.

Optionally, the resource pool transmitting the first signal and/or each resource pool in the at least one resource pool includes at least one transmission resource, and/or the resource pool transmitting the first signal also includes at least one transmission resource. Each of the at least one transmission resource includes: a physical time-frequency resource and/or a sequence resource. The sequence resource may be a sequence in a sequence group, or may also be code words in a codebook, or may also be an interleaving pattern. Further, the transmission resources in each of at least one resource pool are orthogonal to each other, and each resource pool in at least one resource pool is orthogonal to each other, which may be orthogonal to each other in physical time-frequency resources, or may be orthogonal to each other in the sequence resources, or may be orthogonal to each other both in physical time-frequency resources and in the sequence resources.

It should be understood that, the corresponding relationship between the at least one resource pool and the at least one numerology may be that: one resource pool in the at least one resource pool corresponds to one numerology, or one numerology may correspond to one or more resource pools, that is, different resource pools may correspond to the same numerology, and embodiments of the present disclosure are not limited thereto.

It should also be understood that the first numerology and/or each of the at least one numerology mentioned in the embodiment of the present disclosure may include: a subcarrier spacing, an amount of subcarriers included in a system bandwidth, an amount of subcarriers included in a Physical Resource Block PRB, a symbol length of Orthogonal Frequency Division Multiplexing OFDM, an amount of points of Fast Fourier Transformation FFT or Inverse Fourier Transformation IFFT used to generate OFDM signals, an amount of Orthogonal Frequency Division Multiplexing OFDM symbols included in a Transmission Time Interval TTI, an amount of TTIs included in a first time period, and a Cyclic Prefix CP type of the first signal, and a time length of the signal CP. The subcarrier spacing refers to a frequency interval of adjacent subcarriers, for example, 15 kHz, 60 kHz, etc.; the number of subcarriers under a specific system bandwidth is, for example, the number of subcarriers corresponding to each possible system bandwidth; the number of subcarriers included in the PRB, for example, may be typically an integer multiple of 6 or 16; the number of OFDM symbols included in the TTI may be, for example, typically an integer multiple of 2, 4, 7, or may also be an integer multiple of 14; the number of TTIs included in the first time period may refer to the number of TTIs included in the time length of 1 ms or 10 ms; the CP type of the first signal may be that a cyclic prefix uses a regular CP or an extended CP; the time length of CP of the first signal.

Optionally, the numerology may further include: a basic parameter in a newly defined resource partitioning manner in a future network system, which may be, for example, a basic frequency domain unit, a basic frequency domain unit pattern, a subcarrier pattern, an occupied position of a reference symbol in a time domain unit, a TTI pattern in the unit period, a pattern of the subframe in the frame, a pattern of the slot in the subframe, an OFDM pattern in the slot, and the like.

As an optional embodiment, before S110, the method 100 further includes: the terminal device determining the first numerology used to transmit the first signal. The terminal device may determine the first numerology used to transmit signals in following five manners.

In a first manner, the terminal device determines the first numerology used to transmit the first signal according to a service type of the first signal. For example, the network device and the terminal device may pre-appoint that the first service type adopts the numerology 1, and the second service type adopts the numerology 2. When the first signal belongs to the first service type, the terminal device determines that the first numerology is the numerology 1. When the first signal belongs to the second service type, the terminal device determines that the first numerology is the numerology 2.

In a second manner, the terminal device determines the first numerology used to transmit the first signal according to a frequency band transmitting the first signal. For example, the terminal device and the network device pre-appoint that the first working frequency band corresponds to the numerology 3, and the second working frequency band corresponds to the numerology 4. When the terminal device transmits the first signal on the first working frequency band, the terminal device determines that the first numerology is the numerology 3. When the terminal device transmits the first signal on the second working frequency band, the terminal device determines that the first numerology is the numerology 4.

In a third manner, the terminal device determines the first numerology used to transmit the first signal according to a path loss parameter between the terminal device and the network device. For example, the terminal device and the network device pre-appoint that: when the path loss parameter is greater than a first threshold, the numerology 5 is selected. When the path loss parameter is smaller than the first threshold, the numerology 6 is selected. The terminal device determines whether to select the numerology 5 or the numerology 6 as the first numerology according to the path loss parameter between the terminal device and the network device.

In a fourth mode, the network device sends third indication information to the terminal device, the terminal device receives the third indication information sent by a network device, wherein the third indication information is used to indicate that the first numerology is used to transmit the first signal; the terminal device determines the first numerology used to transmit the first signal according to the third indication information. Optionally, the network device may send the third indication information to the terminal device through user-specific signaling, and the terminal device may receive the third indication information sent by the network device through the user-specific signaling. The network device may send the third indication through broadcast signaling, and the terminal device may also receive the third indication information sent by the network device through the broadcast signaling. The network device sends the third indication information to the terminal device by using the DCI, and the terminal device may receive the third indication information sent by the network device by using the DCI. Of course, the network device may send the third indication information to the terminal device through other manners, and the terminal device may also receive the third indication information sent by the network device through other methods, and the embodiment of the present disclosure is not limited thereto.

In a fifth mode, the terminal device detects a second signal other than the first signal, and determines a numerology used to transmit the second signal as a first numerology used to transmit the first signal. That is, the terminal device can detect the numerology used for signals other than the signals that need to be transmitted by itself, and the numerology of other signals can be used as its first numerology.

As an optional embodiment, the terminal device determines, according to the corresponding relationship, that the resource pool transmitting the first signal in the at least one resource pool may be one or more. When the terminal device determines there is one resource pool, the first signal is transmitted on the transmission resource of the resource pool. The terminal device determining the resource pool transmitting the first signal in the at least one resource pool according to the first numerology used to transmit the first signal and the corresponding relationship includes: in the case where the corresponding relationship indicates that a plurality of resource pools correspond to the first numerology, the terminal device determining a resource pool transmitting the first signal in a plurality of resource pools. When the terminal device determines that there is a plurality of resource pools, the resource pool transmitting the first signal may be determined in the following four manners.

In a first manner, the terminal device randomly selects one resource pool among the plurality of resource pools as a resource pool transmitting the first signal, wherein M is an integer greater than or equal to 2 and less than or equal to N.

In a second manner, the terminal device determines a resource pool index based on a radio network temporary identifier of the terminal device or a cell identifier of the terminal device, and determines a resource pool transmitting the first signal in a plurality of resource pools according to the resource pool index.

In a third manner, after performing load measurement to the plurality of resource pools, the terminal device selects a resource pool with a minimum load or with a load lower than a first threshold as a resource pool transmitting the first signal. For example, the power of signals received in the plurality of resource pools can be measured, and the resource pool with the smallest signal average receiving power is selected as the resource pool. If there is a plurality of resource pools with the smallest signal average receiving power, one resource pool among the resource pools with the smallest signal average receiving power may be arbitrarily selected as the resource pool. Of course, further conditions can also be set to select the resource pool in a plurality of resource pools. It is also possible to select a resource pool among resource pools in which the signal average receiving power is less than the set first threshold, or the like, and embodiment of the present disclosure is not limited thereto.

In a fourth manner, before the terminal device determining a resource pool transmitting the first signal in a plurality of resource pools, the method 100 further includes: the terminal device receiving second indication information sent by the network device, wherein the second indication information is used to indicate a resource pool index used by the terminal device to transmit the first signal; wherein the terminal device determining a resource pool in the plurality of resource pools includes: the terminal device determining a resource pool transmitting the first signal in the plurality of resource pools according to a resource pool index indicated by the second indication information.

Specifically, in S120, as for the case the terminal device transmits the first signal by using a transmission resource transmitting the first signal in a resource pool, it may be that the transmission resource transmitting the first signal is firstly determined in the at least one transmission resource included in the resource pool, and then the first signal is transmitted. If the resource pool includes only one transmission resource, the terminal device can transmit the first signal on the one transmission resource, and if the resource pool includes a plurality of transmission resources, the resource transmitting the first signal needs to be further selected among the plurality of transmission resources. Specifically, there may be following four manners to determine the transmission resource transmitting the first signal in the at least one transmission resource included in the resource pool.

In a first manner, the terminal device randomly selects a transmission resource from at least one transmission resource included in a resource pool transmitting the first signal, to transmit the first signal.

In a second manner, the terminal device determines a transmission resource index based on a radio network temporary identifier of the terminal device or a cell identifier of the terminal device, determines a transmission resource transmitting the first signal in the at least one transmission resource included in the resource pool transmitting the first signal according to the transmission resource index, and transmits the first signal on a transmission resource transmitting the first signal.

In a third manner, the terminal device retains a pre-configured transmission resource index, and the terminal device determines, according to the pre-configured transmission resource index, the transmission resource transmitting the first signal in the at least one transmission resource included in the resource pool transmitting the first signal, and transmits the first signal on a resource transmitting the first signal.

In a fourth manner, the terminal device performs load measurement on at least one transmission resource included in a resource pool transmitting the first signal, and selects a transmission resource with a minimum load or with a load lower than a second threshold, and transmits the first signal on the transmission resource with the minimum load or with the load lower than the second threshold. For example, the terminal device measures the signal receiving power of each of the at least one transmission resource in the resource pool, and uses the transmission resource with the lowest average receiving power as the resource transmitting the first signal, and if there are multiple transmission resources with the lowest signal average receiving power, the first signal may be transmitted by any one transmission resource arbitrarily selected from the plurality of transmission resources. Of course, any one of the transmission resources whose signal average receiving power is less than the preset threshold may be selected as the resource transmitting the first signal.

Therefore, in the signal transmission method according to the embodiment of the present disclosure, the terminal device determines, according to the corresponding relationship between the resource pool and the numerology, the resource pool corresponding to the first numerology of the terminal device, and uses the transmission resource in the resource pool to transmit the first signal, which prevents a specific resource pool from being allocated to a terminal device in the prior art. In this embodiment of the present disclosure, a terminal device may select a resource pool according to a signal. For example, a first numerology transmitting the signal may be selected according to a frequency band of a transmission signal and a service type of a signal, and then the resource pool transmitting the first signal is determined according to the corresponding relationship, which can meet the requirement of the resource pool by the terminal device, and improve the flexibility of the terminal device to select the resource pool.

For ease of understanding, following two specific examples are given, but are not intended to limit the embodiments of the present disclosure. In the first example, the terminal device acquires the corresponding relationship through Radio Resource Control ("RRC") signaling, and the numerology is the subcarrier spacing, which specifically includes following steps.

In the first step, the network device sends the RRC signaling to the terminal device, where the RRC signaling carries first indication information. For example, the first indication information indicates N resource pools corresponding to N different subcarrier spacings. Specifically, the first indication information may indicate: a frequency domain start location and an end location of each resource pool of the N resource pools, subframes included in each of the resource pools, each resource pool including at least one time-frequency resource, and each subcarrier corresponding to one resource pool. Of course, each subcarrier can correspond to a plurality of resource pools. For specific convenience, it is assumed herein that each subcarrier corresponds to one resource pool.

In the second step, after receiving the first indication information sent by the network device through the RRC signaling, the terminal device determines the subcarrier spacing used to send the contention-based random access signal according to the service type of the data to be currently transmitted.

In a third step, the terminal device determines the target resource pool transmitting the data to be currently transmitted in the N resource pools, according to the subcarrier spacing and the first indication information.

In a fourth step, the terminal device arbitrarily selects one physical time-frequency resource in the at least one physical time-frequency resource included in the target resource pool, to perform the transmission of random access signals.

In the second example, the terminal device acquires the corresponding relationship through the broadcast signaling, and the numerology is a cyclic prefix type, which specifically includes following steps.

In a first step, the network device broadcasts signaling to the terminal device, where the broadcast signaling carries first indication information, the first indication information indicates N resource pools and a cyclic prefix type corresponding to the N resource pools. Specifically, the first indication information may indicate: a start location and an end location of the frequency domain resource, subframes included in each resource pool, each resource pool including at least one transmission resource, and each transmission resource including a time-frequency resource and a sequence resource, sequence resources included in each resource pool.

In a second step, after receiving the broadcast signaling broadcast by the network device, the terminal device determines the cyclic prefix type used to send the data signal after acquiring the first indication information in the broadcast signaling.

In a third step, the terminal device determines, in the N resource pools, two resource pools corresponding to the cyclic prefix type sending the data signal.

In a fourth step, the terminal device determines the resource pool index according to the RRC signaling received in advance, and determines a target resource pool in the two resource pools according to the resource pool index.

In a fifth step, the terminal device calculates an index of the transmission resource according to the RNTI, and determines, according to the index of the transmission resource, the resource transmitting the data signal in the at least one transmission resource included in the target resource pool, where the terminal device transmits the data signal on the time-frequency resource and the sequence resource included in the transmission resource.

The signal transmission method according to an embodiment of the present disclosure is described above with reference to FIG. 1, and the signal transmission apparatus in the embodiment of the present disclosure will be described below with reference to FIGS. 2 and 3.

Figure 2:
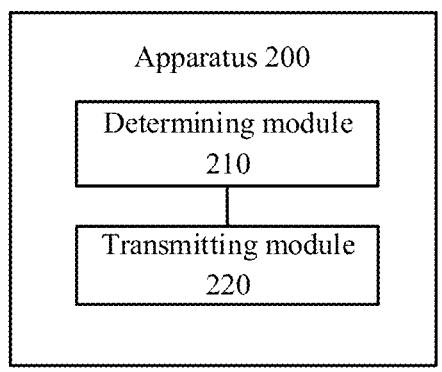
FIG. 2 is a schematic block diagram of a signal transmission apparatus according to an embodiment of the present disclosure.

FIG. 2 is a schematic diagram of a signal transmission apparatus 200 according to an embodiment of the present disclosure. The apparatus may be, for example, a terminal device in the method 100, and the apparatus 200 includes:

a determining module 210, configured to determine a resource pool transmitting a first signal according to a first numerology used to transmit the first signal;

a transmitting module 220, configured to transmit the first signal by using a transmission resource in the resource pool transmitting the first signal.

As an optional embodiment, the apparatus 200 further includes: an acquiring module, configured to acquire a corresponding relationship between at least one resource pool and at least one numerology before a resource pool transmitting a first signal is determined according to a first numerology used to transmit the first signal, wherein the corresponding relationship is used to indicate that each numerology in the at least one numerology corresponds to one or more resource pools, the at least one numerology includes the first numerology; the determining module 210 is further configured to: determine the resource pool transmitting the first signal in the at least one resource pool according to the first numerology used to transmit the first signal and the corresponding relationship.

As an optional embodiment, the acquiring module is configured to: receive first indication information sent by a network device, wherein the first indication information is used to indicate the corresponding relationship; acquire the corresponding relationship between the at least one resource pool and the at least one numerology according to the first indication information.

As an optional embodiment, the determining module 210 is configured to: in the case where the corresponding relationship indicates that a plurality of resource pools correspond to the first numerology, determine a resource pool transmitting the first signal in a plurality of resource pools.

As an optional embodiment, the determining module 210 is further configured to: randomly select one resource pool among the plurality of resource pools as a resource pool transmitting the first signal; or determine a resource pool index based on a transmission parameter of the apparatus, and determine a resource pool transmitting the first signal in the plurality of resource pools according to the resource pool index; or after load measurement to the plurality of resource pools is performed, select a resource pool with a minimum load or with a load lower than a first threshold as a resource pool transmitting the first signal.

As an optional embodiment, the apparatus 200 further includes: a receiving module, configured to receive second indication information sent by the network device before a resource pool transmitting the first signal is determined in a plurality of resource pools, wherein the second indication information is used to indicate a resource pool index used by the apparatus to transmit the first signal; the determining module 210 is further configured to: determine a resource pool transmitting the first signal in the plurality of resource pools according to a resource pool index indicated by the second indication information.

As an optional embodiment, the determining module 220 is further configured to: determine the first numerology used to transmit the first signal before a resource pool transmitting a first signal is determined according to a first numerology used to transmit the first signal.

As an optional embodiment, the determining module 210 is further configured to: determine the first numerology used to transmit the first signal according to at least one of a service type, a frequency band, and a path loss parameter of the first signal.

As an optional embodiment, the determining module 210 is further configured to: receive third indication information sent by a network device, wherein the third indication information is used to indicate that the first numerology is used to transmit the first signal; determine the first numerology used to transmit the first signal according to the third indication information.

As an optional embodiment, the determining module 210 is further configured to: detect a second signal other than the first signal, and determine a numerology used to transmit the second signal as a first numerology used to transmit the first signal.

As an optional embodiment, the transmitting module 220 is further configured to:

randomly select a transmission resource from at least one transmission resource included in a resource pool transmitting the first signal, to transmit the first signal; or determine a transmission resource index based on a transmission parameter of the apparatus, determine a transmission resource transmitting the first signal in at least one transmission resource included in a resource pool transmitting the first signal according to the transmission resource index, and transmit the first signal on the transmission resource transmitting the first signal; or determine a transmission resource transmitting the first signal in at least one transmission resource included in a resource pool transmitting the first signal according to a pre-configured transmission resource index, and transmit the first signal on the transmission resource transmitting the first signal; or perform load measurement on at least one transmission resource included in a resource pool transmitting the first signal, and select a transmission resource with a minimum load or with a load lower than a second threshold, and transmit the first signal on the transmission resource with the minimum load or with the load lower than the second threshold.

As an optional embodiment, the resource pool includes at least one transmission resource, each of the at least one transmission resource includes: a physical time-frequency resource and/or a sequence resource.

As an optional embodiment, the numerology includes at least one of: a subcarrier spacing, an amount of subcarriers included in a system bandwidth, an amount of subcarriers included in a Physical Resource Block PRB, a symbol length of Orthogonal Frequency Division Multiplexing OFDM, an amount of points of Fast Fourier Transformation FFT or Inverse Fourier Transformation IFFT used to generate OFDM signals, an amount of Orthogonal Frequency Division Multiplexing OFDM symbols included in a Transmission Time Interval TTI, an amount of TTIs included in a first time period, and a Cyclic Prefix CP type of the first signal, and a time length of the signal CP.

As an optional embodiment, the first signal is a random access signal, a data signal or an uplink control signal.

It should be understood that the apparatus 200 herein is embodied in the form of a functional module. The term "module" as used herein may refer to an application specific integrated circuit (ASIC), an electronic circuit, a processor (e.g., a shared processor, a proprietary processor, or a group processor, etc.) for executing one or more software or firmware programs, and a memory, a merge logic circuit, and/or other suitable components that support the functions described. In an optional example, those skilled in the art may understand that the apparatus 200 may be embodied as the terminal device in the foregoing embodiment, and the apparatus 200 may be used to perform various processes and/or steps corresponding to the terminal device in the foregoing method 100 embodiments. To avoid repetition, it will not be repeated herein.

Figure 3:
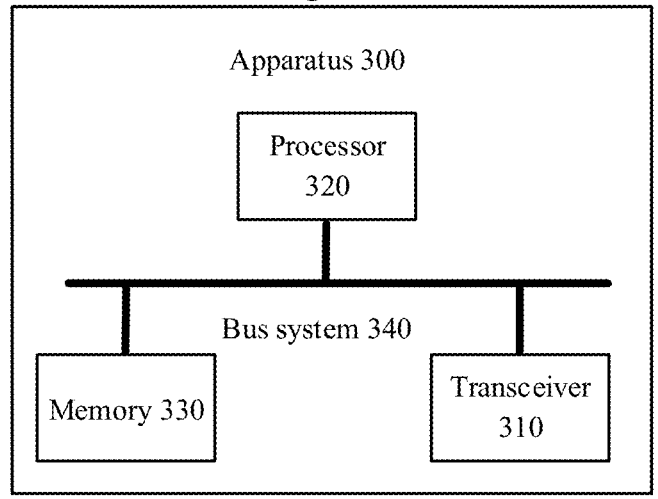
FIG. 3 is a schematic block diagram of a signal transmission apparatus according to another embodiment of the present disclosure.

FIG. 3 shows a signal transmission apparatus 300 according to an embodiment of the present disclosure. For example, the apparatus 300 can be a terminal device in the method 100, the apparatus 300 includes a transceiver 310, a processor 320, a memory 330, and a bus system 340. The transceiver 310, the processor 320 and the memory 330 are connected by a bus system 340. The memory 330 is used for storing instructions. The processor 320 is used for executing instructions stored in the memory 330, to control the transceiver 310 to send or receive signals.

The processor 320 is configured to determine a resource pool transmitting a first signal according to a first numerology used to transmit the first signal; the transceiver 310 is configured to transmit the first signal to transmit the first signal by using a transmission resource in the resource pool.

As an optional embodiment, the transceiver 310 is further configured to acquire a corresponding relationship between at least one resource pool and at least one numerology before a resource pool transmitting a first signal is determined according to a first numerology used to transmit the first signal, wherein the corresponding relationship is used to indicate that each numerology in the at least one numerology corresponds to one or more resource pools, the at least one numerology includes the first numerology; the processor 320 is further configured to: determine the resource pool transmitting the first signal in the at least one resource pool according to the first numerology used to transmit the first signal and the corresponding relationship.

As an optional embodiment, the transceiver 310 is further configured to: receive first indication information sent by a network device, wherein the first indication information is used to indicate the corresponding relationship; acquire the corresponding relationship between the at least one resource pool and the at least one numerology according to the first indication information.

As an optional embodiment, the processor 320 is configured to: in the case where the corresponding relationship indicates that a plurality of resource pools correspond to the first numerology, determine a resource pool transmitting the first signal in a plurality of resource pools.

As an optional embodiment, the processor 320 is configured to: randomly select one resource pool among the plurality of resource pools as a resource pool transmitting the first signal; or determine a resource pool index based on a transmission parameter of the apparatus, and determine a resource pool transmitting the first signal in the plurality of resource pools according to the resource pool index; or after load measurement to the plurality of resource pools is performed, select a resource pool with a minimum load or with a load lower than a first threshold as a resource pool transmitting the first signal.

As an optional embodiment, the transceiver 310 is further configured to receive second indication information sent by the network device before a resource pool transmitting the first signal is determined in a plurality of resource pools, wherein the second indication information is used to indicate a resource pool index used by the apparatus to transmit the first signal; the processor 320 is further configured to: determine a resource pool transmitting the first signal in the plurality of resource pools according to a resource pool index indicated by the second indication information.

As an optional embodiment, the processor 320 is further configured to: determine the first numerology used to transmit the first signal before a resource pool transmitting a first signal is determined according to a first numerology used to transmit the first signal.

As an optional embodiment, the processor 320 is further configured to: determine the first numerology used to transmit the first signal according to at least one of a service type, a frequency band, and a path loss parameter of the first signal.

As an optional embodiment, the processor 320 is further configured to: receive third indication information sent by a network device, wherein the third indication information is used to indicate that the first numerology is used to transmit the first signal; determine the first numerology used to transmit the first signal according to the third indication information.

As an optional embodiment, the processor 320 is further configured to: detect a second signal other than the first signal, and determine a numerology used to transmit the second signal as a first numerology used to transmit the first signal.

As an optional embodiment, the transceiver 310 is configured to:

randomly select a transmission resource from at least one transmission resource included in a resource pool transmitting the first signal, to transmit the first signal; or determine a transmission resource index based on a transmission parameter of the apparatus, determine a transmission resource transmitting the first signal in at least one transmission resource included in a resource pool transmitting the first signal according to the transmission resource index, and transmit the first signal on the transmission resource transmitting the first signal; or determine a transmission resource transmitting the first signal in at least one transmission resource included in a resource pool transmitting the first signal according to a pre-configured transmission resource index, and transmit the first signal on the transmission resource transmitting the first signal; or perform load measurement on at least one transmission resource included in a resource pool transmitting the first signal, and select a transmission resource with a minimum load or with a load lower than a second threshold, and transmit the first signal on the transmission resource with the minimum load or with the load lower than the second threshold.

As an optional embodiment, the resource pool includes at least one transmission resource, each of the at least one transmission resource includes: a physical time-frequency resource and/or a sequence resource.

As an optional embodiment, the numerology includes at least one of: a subcarrier spacing, an amount of subcarriers included in a system bandwidth, an amount of subcarriers included in a Physical Resource Block PRB, a symbol length of Orthogonal Frequency Division Multiplexing OFDM, an amount of points of Fast Fourier Transformation FFT or Inverse Fourier Transformation IFFT used to generate OFDM signals, an amount of Orthogonal Frequency Division Multiplexing OFDM symbols included in a Transmission Time Interval TTI, an amount of TTIs included in a first time period, and a Cyclic Prefix CP type of the first signal, and a time length of the signal CP.

As an optional embodiment, the first signal is a random access signal, a data signal or an uplink control signal.

It should be understood that the apparatus 300 may be specifically the terminal device in the foregoing embodiment, and may be used to perform various steps and/or processes corresponding to the terminal device in the foregoing method embodiments. Optionally, the memory 340 can include read only memory and random access memory and provide instructions and data to the processor. A portion of the memory may also include a non-volatile random access memory. For example, the memory can also store information of the device type. The processor 320 can be configured to execute instructions stored in the memory, and when the processor executes the instructions, the processor can perform the various steps corresponding to the terminal device in the above-described method 100 embodiment.

It should be understood that, in the embodiment of the present disclosure, the processor 320 may be a central processing unit (CPU), and the processor may also be other general purpose processors, digital signal processors (DSPs), and application specific integrated circuits (ASICs), Field Programmable Gate Arrays (FPGAs) or other programmable logic devices, discrete gates or transistor logic devices, discrete hardware components, etc. The general purpose processor may be a microprocessor or the processor may also be any conventional processor or the like.

It should be understood that, the term "and/or" in this context is merely an association describing the associated objects, indicating that there may be three relationships, for example, A and/or B, which may indicate that A exists separately, both A and B exist, and B exists separately. In addition, the character "/" herein generally indicates an "or" relationship of contextual objects.

It should be understood that, in various embodiments of the present disclosure, the sequence numbers of the above processes do not mean the order of execution, and the order of execution of each process should be determined by its function and internal logic, and should not be taken to constitute any limitation to the implementation process of embodiments of the present disclosure.

Those of ordinary skill in the art will appreciate that the units and algorithm steps of the various examples described in connection with the embodiments disclosed herein can be implemented in electronic hardware or a combination of computer software and electronic hardware. Whether these functions are performed in hardware or software depends on the specific application and design constraints of the technical solution. A person skilled in the art can use different methods for implementing the described functions for each particular application, but such implementation should not be considered to go beyond the scope of the present disclosure.

A person skilled in the art can clearly understand that for the convenience and brevity of the description, the specific working process of the system, the device and the unit described above can refer to the corresponding process in the foregoing method embodiment, and details are not described herein again.

In the several embodiments provided by the present disclosure, it should be understood that the disclosed systems, apparatuses, and methods may be implemented in other manners. For example, the apparatus embodiments described above are merely illustrative. For example, the division of the unit is only a logical function division. In actual implementation, there may be another division manner. For example, a plurality of units or components may be combined or integrated into another system, or some features can be ignored or not executed. In addition, the coupling or direct coupling or communication connection shown or discussed may be an indirect coupling or communication connection through some interfaces, apparatuses or units, which may be electrical, mechanical or otherwise.

The units described as separate components may or may not be physically separated, and the components displayed as units may or may not be physical units. That is, they may be located in one place, or may be distributed to multiple network units. Some or all of the units may be selected according to actual needs to achieve the purpose of the technical solution of the embodiment.

In addition, each functional unit in each embodiment of the present disclosure may be integrated into one processing unit, or each unit may exist physically separately, or two or more units may be integrated into one unit.

The functions may be stored in a computer readable storage medium if implemented in the form of a software functional unit and sold or used as a standalone product. Based on such understanding, the technical solution of the present disclosure which is essential or a part contributes to the prior art, or a part of the technical solution, may be embodied in the form of a software product, which is stored in a storage medium, including instructions to cause a computer device (which may be a personal computer, server, or network device, etc.) to perform all or part of the steps of the methods described in various embodiments of the present disclosure. The foregoing storage medium includes: a U disk, a mobile hard disk, a Read-Only Memory ("ROM"), a Random Access Memory ("RAM"), a disk, or an optical disk or other media that can store program codes.

The above is only the specific embodiment of the present disclosure, but the scope of the present disclosure is not limited thereto, and any person skilled in the art can easily think of changes or substitutions within the technical scope of the present disclosure and they should be covered by the scope of the present disclosure. Therefore, the scope of the disclosure should be determined by the scope of the claims.

What is claimed is:

1. A signal transmission method, comprising:
    acquiring, by a terminal device, a corresponding relationship between at least one resource pool and at least one subcarrier spacing, wherein the corresponding relationship indicates that each subcarrier spacing in the at least one subcarrier spacing corresponds to a plurality of resource pools, the at least one subcarrier spacing comprises a first subcarrier spacing;
    determining, by the terminal device, the first subcarrier spacing used for transmission of a first signal;
    determining, by the terminal device from the plurality of resource pools, a resource pool for transmission of the first signal according to the first subcarrier spacing for transmission of the first signal at a working frequency band and the corresponding relationship; and
    transmitting, by the terminal device, the first signal using a transmission resource in the resource pool;
    wherein the determining, by the terminal device from the plurality of resource pools, the resource pool for transmission of the first signal comprises: randomly selecting one resource pool among the plurality of resource pools as the resource pool for transmission of the first signal; or determining, by the terminal device, a resource pool index based on a transmission parameter of the terminal device, and determining the resource pool for transmission of the first signal among the plurality of resource pools according to the resource pool index; or after performing load measurement to the plurality of resource pools, selecting, by the terminal device, a resource pool with a minimum load or with a load lower than a first threshold as the resource pool for transmission of the first signal, and
    wherein the transmitting, by the terminal device, the first signal using the transmission resource in the resource pool comprises: randomly selecting a transmission resource from at least one transmission resource included in the resource pool for transmission of the first signal, to transmit the first signal; or determining a transmission resource index based on the transmission parameter of the terminal device, determining a transmission resource for transmission of the first signal in at least one transmission resource included in the resource pool for transmission of the first signal according to the transmission resource index, and transmitting the first signal on the transmission resource for transmission of the first signal; or determining a transmission resource for transmission of the first signal in at least one transmission resource included in the resource pool for transmission of the first signal according to a pre-configured transmission resource index, and transmitting the first signal on the transmission resource for transmission of the first signal; or performing load measurement on at least one transmission resource included in the resource pool for transmission of the first signal, and selecting a transmission resource with a minimum load or with a load lower than a second threshold, and transmitting the first signal on the transmission resource with the minimum load or with the load lower than the second threshold.

2. The method according to claim 1, comprising:
determining, by the terminal device, the working frequency band.

3. The method according to claim 2, comprising:
determining, by the terminal device, the first subcarrier spacing of the resource pool according to the working frequency band.

4. The method according to claim 1, comprising:
determining, by the terminal device, the first subcarrier spacing of the resource pool according to the working frequency band.

5. The method according to claim 1, wherein the first subcarrier spacing comprising at least one of 15 kHz, 30 kHz, 60 kHz, 120 kHz, 240 kHz.

6. The method according to claim 1, comprising:
receiving, by the terminal device, an indication information sent by a network device;
wherein the indication information is configured to indicate that the first subcarrier spacing is used to transmit the first signal.

7. The method according to claim 6, further comprising:
determining, by the terminal device, the first subcarrier spacing for transmission of the first signal according to the indication information.

8. The method according to claim 1, wherein the at least one transmission resource comprises: a physical time-frequency resource.

9. A signal transmission method, comprising:
transmitting, by a network device, an indication information to indicate a terminal device to acquire a corresponding relationship between at least one resource pool and at least one subcarrier spacing, wherein the corresponding relationship indicates that each subcarrier spacing in the at least one subcarrier spacing corresponds to a plurality of resource pools, the at least one subcarrier spacing comprises a first subcarrier spacing, determining the first subcarrier spacing used for transmission of a first signal, and determine the resource pool for transmission of the first signal according to the first subcarrier spacing for transmission of the first signal at a working frequency band and the corresponding relationship; and
receiving from the terminal device, by the network device, the first signal transmitted on a transmission resource in the resource pool;
wherein the indication information is configured to indicate the terminal to:
randomly select one resource pool among the plurality of resource pools as the resource pool for transmission of the first signal; or determine a resource pool index based on a transmission parameter of the terminal device, and determine the resource pool for transmission of the first signal among the plurality of resource pools according to the resource pool index; or after performing load measurement to the plurality of resource pools, select a resource pool with a minimum load or with a load lower than a first threshold as the resource pool for transmission of the first signal, and
randomly select a transmission resource from at least one transmission resource included in the resource pool for transmission of the first signal, to transmit the first signal; or determine a transmission resource index based on the transmission parameter of the terminal device, determine a transmission resource for transmission of the first signal in at least one transmission resource included in the resource pool for transmission of the first signal according to the transmission resource index, and transmit the first signal on the transmission resource for transmission of the first signal; or determine a transmission resource for transmission of the first signal in at least one transmission resource included in the resource pool for transmission of the first signal according to a pre-configured transmission resource index, and transmit the first signal on the transmission resource for transmission of the first signal; or perform load measurement on at least one transmission resource included in the resource pool for transmission of the first signal, and select a transmission resource with a minimum load or with a load lower than a second threshold, and transmitting the first signal on the transmission resource with the minimum load or with the load lower than the second threshold.

10. The method according to claim 9, wherein the working frequency band is determined by the terminal device.

11. The method according to claim 9, wherein the first subcarrier spacing of the resource pool is determined according to the working frequency band.

12. The method according to claim 9, wherein the first subcarrier spacing is $15*2^k$, wherein k is an integer equal to or bigger than zero.

13. The method according to claim 9, wherein the at least one transmission resource comprises: a physical time-frequency resource.

14. A network device, comprising:
at least one processor; and
at least one memory including program code;
the at least one memory and the program code configured to, with the at least one processor, cause the network device to perform the following:
transmit, by a network device, an indication information to indicate a terminal device to acquire a corresponding relationship between at least one resource pool and at least one subcarrier spacing, wherein the corresponding relationship indicates that each subcarrier spacing in the at least one subcarrier spacing corresponds to a plurality of resource pools, the at least one subcarrier spacing comprises a first subcarrier spacing, determining the first subcarrier spacing used for transmission of a first signal, and determine the resource pool for transmission of the first signal according to the first subcarrier spacing for transmission of a first signal at a working frequency band and the corresponding relationship; and
receive from the terminal device, by the network device, the first signal transmitted on a transmission resource in the resource pool;
wherein the indication information is configured to indicate the terminal to:
randomly select one resource pool among the plurality of resource pools as the resource pool for transmission of the first signal; or determine a resource pool index based on a transmission parameter of the terminal device, and determine the resource pool for transmission of the first signal among the plurality of resource pools according to the resource pool index; or after performing load measurement to the plurality of resource pools, select a resource pool with a minimum load or with a load lower than a first threshold as the resource pool for transmission of the first signal, and
randomly select a transmission resource from at least one transmission resource included in the resource pool for transmission of the first signal, to transmit the first signal; or determine a transmission resource index based on the transmission parameter of the terminal device, determine a transmission resource for transmission of the first signal in at least one transmission resource included in the resource pool for transmission of the first signal according to the transmission resource index, and transmit the first signal on the transmission resource for transmission of the first signal; or determine a transmission resource for transmission of the first signal in at least one transmission resource included in the resource pool for transmission of the first signal according to a pre-configured transmission resource index, and transmit the first signal on the transmission resource for transmission of the first signal; or perform load measurement on at least one transmission resource included in the resource pool for transmission of the first signal, and select a transmission resource with a minimum load or with a load lower than a second threshold, and transmitting the first signal on the transmission resource with the minimum load or with the load lower than the second threshold.

15. The network device according to claim 14, wherein the working frequency band is determined by the terminal device.

16. The network device according to claim 14, wherein the first subcarrier spacing of the resource pool is determined according to the working frequency band.

17. The network device according to claim 14, wherein of the at least one transmission resource comprises: a physical time-frequency resource.

* * * * *